(12) United States Patent
Chiecchi

(10) Patent No.: US 8,376,792 B2
(45) Date of Patent: Feb. 19, 2013

(54) METHOD FOR CONTROLLING A WATERCRAFT HAVING A SURFACE DRIVE

(75) Inventor: Andrea Chiecchi, Verona (IT)

(73) Assignee: ZF Friedrichshafen AG, Friedrichshafen (DE)

( * ) Notice: Subject to any disclaimer, the term of this patent is extended or adjusted under 35 U.S.C. 154(b) by 276 days.

(21) Appl. No.: 12/678,879

(22) PCT Filed: Dec. 6, 2007
(Under 37 CFR 1.47)

(86) PCT No.: PCT/EP2007/063439
§ 371 (c)(1),
(2), (4) Date: Jul. 26, 2010

(87) PCT Pub. No.: WO2009/046770
PCT Pub. Date: Apr. 16, 2009

(65) Prior Publication Data
US 2011/0263167 A1    Oct. 27, 2011

(30) Foreign Application Priority Data
Oct. 5, 2007    (DE) .......................... 10 2007 048 060

(51) Int. Cl.
*B63H 20/08* (2006.01)
*G05D 3/00* (2006.01)
(52) U.S. Cl. .......................................... 440/53; 701/21
(58) Field of Classification Search .................... 701/21; 440/53, 61 S, 61 T, 61 G, 87
See application file for complete search history.

(56) References Cited

U.S. PATENT DOCUMENTS

| | | | |
|---|---|---|---|
| 3,774,568 A | 11/1973 | Borst et al. | |
| 4,225,148 A | 9/1980 | Andersson | |
| 4,531,427 A | 7/1985 | Nilsson | |

(Continued)

FOREIGN PATENT DOCUMENTS

| | | |
|---|---|---|
| CN | 1237524 A | 12/1999 |
| DE | 569 396 | 1/1933 |

(Continued)

OTHER PUBLICATIONS

State Intellectual Property Office of the People's Republic of China. Notification of the First Office Action. 6 pages, Apr. 2012.

*Primary Examiner* — Stephen Avila
*Assistant Examiner* — Anthony Wiest
(74) *Attorney, Agent, or Firm* — Davis & Bujold, PLLC

(57) ABSTRACT

A method of controlling a watercraft having a drive which can be pivoted about a control angle. A maximum adjustable control angle is automatically reduced by a defined gradient with an increasing speed. The drive is configured as a surface drive comprising at least two drive units, and the drive units are adjusted in the vertical direction about a trim angle (T) in a pre-adjustable automatic operating mode (301). During a driving mode in which the maximum speed is reached, once the control angle ($\sigma$) exceeds a first threshold angle ($\sigma\_41$) which is smaller than the maximum adjustable control angle $\sigma\_L$), the adjustment of trim angle (T) exits the automatic operating mode (301) and enters a stand-by operating mode (300) in which the trim angle (T) is manually adjusted until the control angle ($\sigma$) falls below a second threshold control angle ($\sigma\_42$) and the automatic operating mode (301) is re-activated.

6 Claims, 4 Drawing Sheets

U.S. PATENT DOCUMENTS

| | | | |
|---|---|---|---|
| 4,544,362 | A | 10/1985 | Arneson |
| 4,645,463 | A | 2/1987 | Arneson |
| 4,931,025 | A | 6/1990 | Torigai et al. |
| 4,939,660 | A | 7/1990 | Newman et al. |
| 5,118,315 | A | 6/1992 | Funami et al. |
| 5,167,546 | A | 12/1992 | Whipple |
| 5,169,348 | A | 12/1992 | Ogiwara et al. |
| 5,203,727 | A | 4/1993 | Fukui |
| 5,326,294 | A | 7/1994 | Schoell |
| 5,385,110 | A | 1/1995 | Bennett et al. |
| 5,549,493 | A | 8/1996 | Bezzi |
| 5,647,780 | A | 7/1997 | Hosoi |
| 5,785,562 | A | 7/1998 | Nestvall |
| 6,431,928 | B1 | 8/2002 | Aarnivuo |
| 6,726,511 | B1 | 4/2004 | Schelman |
| 6,843,195 | B2 | 1/2005 | Watabe et al. |
| 6,899,196 | B2 | 5/2005 | Husain et al. |
| 6,908,350 | B1 | 6/2005 | Roessler et al. |
| 7,137,347 | B2 | 11/2006 | Wong et al. |
| 7,295,905 | B2 | 11/2007 | Yao et al. |
| 7,568,549 | B2 | 8/2009 | Wun et al. |
| 2004/0139903 | A1 | 7/2004 | Watabe et al. |
| 2005/0170712 | A1 | 8/2005 | Okuyama |
| 2006/0042532 | A1 | 3/2006 | Wong et al. |
| 2007/0068438 | A1 | 3/2007 | Mizutani |

FOREIGN PATENT DOCUMENTS

| | | |
|---|---|---|
| DE | 31 30 518 A1 | 4/1982 |
| DE | 42 13 561 A1 | 10/1992 |
| DE | 101 58 870 A1 | 5/2003 |
| DE | 10 2004 050 014 A1 | 6/2005 |
| DE | 10 2005 036 686 A1 | 12/2005 |
| DE | 699 22 397 T2 | 12/2005 |
| DE | 11 2004 001 258 T5 | 10/2006 |
| EP | 0 102 579 A2 | 3/1984 |
| EP | 1 770 008 A2 | 4/2007 |
| EP | 1 792 802 A2 | 6/2007 |
| JP | 2-279495 A | 11/1990 |
| WO | 99/22989 A1 | 5/1999 |

METHOD FOR CONTROLLING A WATERCRAFT HAVING A SURFACE DRIVE

This application is a National stage completion of PCT/EP2007/063439 filed Dec. 6, 2007, which claims priority from German patent application serial no. 10 2007 048 060.3 filed on Oct. 5, 2007.

FIELD OF THE INVENTION

The invention relates to a method for controlling a watercraft having a surface drive.

BACKGROUND OF THE INVENTION

In fast, motor-driven watercrafts, particularly those having a surface drive, the hull is in a planing state at higher speeds, with the stern just lying partially in the water. When turning curves and during the related tilted position of the watercraft, the point of contact with the water shifts to the side surface of the bottom of the hull causing the force application of the driving resistance at the hull to change and generate a moment. From a critical control angle and the resultant tight turning radius the thus generated moment is so high that starting at a certain speed the watercraft is deflected from its path and may capsize.

The surface drive of a watercraft consists of at least one drive unit, in which the direction of the propulsion force is changed by a control unit, which mainly consists of a thrust tube that guides a propeller shaft and a control and trim actuator system. The thrust tube can be pivoted about a control angle and is connected with the stern of the watercraft and the drive shaft coming directly from the motor or a transmission downstream of the motor. The thrust tube is furthermore moved by the trim actuator system in the vertical direction and, to generate a change in direction of the watercraft, by the control actuator system in the horizontal pivot plane. The maximum freedom of movement in both planes is characterized by a maximally adjustable control angle and a trimming range. The control angle and the trim angle are the measure of the respective pivoting motion. The activation of the control and trim actuator system is accomplished via an electronic control unit, which electronically receives the desired control angle signal from the skipper. The trim angle can optionally be speed-dependently and/or rotation-dependently adjusted to an automatic mode of operation. In order to prevent excessive control angles at high speeds, the speed of a watercraft and the control angle are acquired by the electronic control unit, and a reduced maximum adjustable control angle is accordingly automatically determined. The control range is again correspondingly increased when the speed is reduced.

At high speeds in connection with a tight turning radius and/or a maximum control angle the watercraft takes up a significantly tilted position, whereby the described unstable driving condition need still not to have been reached. It is on the other hand possible that in a surface drive, which comprises at least two drive units, from a critically tilted position the propeller of the drive unit on the outside curve is no longer running in the water. The load and the rotational speed increase because of the missing or significantly reduced displacement of the propeller. The automatic trim adjustment cannot correct this condition because both drive units are mechanically connected, and the connection only permits minor interconnections of the drive units.

From JP 02-279495, a system is known where the maximum adjustable control angle in an outboard drive is mechanically reduced with increasing speed.

U.S. Pat. No. 6,843,195 B2 describes a control system for an outboard motor, where the quotient "realized control angle/control angle entered by the rudder" declines with increasing speed, so that with increasing speed turning the steering wheel at the outboard drive will result in a minor change of the control angle as at lower speeds. Moreover, a method for limiting the maximum adjustable control angle depending on the rotational speed and/or speed is disclosed.

Both systems only relate to outboard motors whose propeller and control arrangement are significantly different from a surface drive.

SUMMARY OF THE INVENTION

The object underlying the invention is to provide a method for controlling a surface drive having at least two drive units for turning curves in the higher speed range.

According to this method for controlling a watercraft, a drive can be pivoted about a control angle to produce a change of direction of the watercraft. The control angle can only be changed up to a maximum adjustable control angle, which is automatically reduced in a defined gradient with increasing speed. In an embodiment of the drive being a surface drive, the surface drive is operated in at least two operating modes and consists of at least two drive units, which are adjusted in the vertical direction about a trim angle in a pre-adjustable automatic operating mode. According to the present invention, in a driving mode in which the watercraft reaches its maximum speed, in case of exceeding the first threshold control angle defined in an electronic control unit, which is smaller than the maximum adjustable control angle, the automatic adjustment of the trim angle exits the automatic operating mode of the trim angle and switches to a stand-by operating mode. The trim angle has to be manually adjusted, since due to the tilted position of the watercraft while turning the curve, the propeller on the outside curve is no longer running in the water upon reaching the first threshold control angle and the automatic adjustment of the trim angle can no longer correct the rotational speed deviation. The stand-by operating mode remains active until it falls below a second threshold control and the electronic control unit re-activates the automatic operating mode of the trim angle.

In a development of the method according to the present invention, the first threshold control angle to be exceeded is greater than the second threshold control angle below threshold. This hysteresis prevents frequent switching between the automatic adjustment of the trim angle and stand-by operating modes for control angles within the range of the first threshold control angle.

It is finally considered to be advantageous that the threshold control angles as well as the maximum adjustable control angle depend on the speed and/or the rotational speed and are calculated from a table of values or a characteristic curve that is stored in an electronic control unit or calculated according to a mathematical function.

The driving modes are preferably defined both by an upper and lower rotational speed limit or by an upper and lower speed limit of the watercraft, where the rotational speed relates to that of a motor, a power train or a propeller shaft.

According to the invention, it is also possible that the maximum adjustable control angle is still not reduced in a first driving mode, which extends from the first rotational speed limit to a second rotational speed limit, and linearly decreases with increasing speed in other driving modes.

Another version offers the possibility that the maximum adjustable control angle in a first driving mode, which extends from the first rotational speed limit up to a second rotational speed limit, is still at a maximum and in every subsequent faster driving mode, in which the trim angle is automatically adjusted according to a different operating mode, the maximum adjustable control angle remains constant for each driving mode and decreases at the transition to the next higher driving mode. A stepped reduction of the maximum adjustable control angle is thus created throughout the entire operating mode with increasing rotational speed and/or speed.

BRIEF DESCRIPTION OF THE DRAWINGS

An exemplary embodiment of the invention is shown in the drawing and will hereinafter be described in more detail.

The drawings show.

DETAILED DESCRIPTION OF THE PREFERRED EMBODIMENTS

Figure 1:
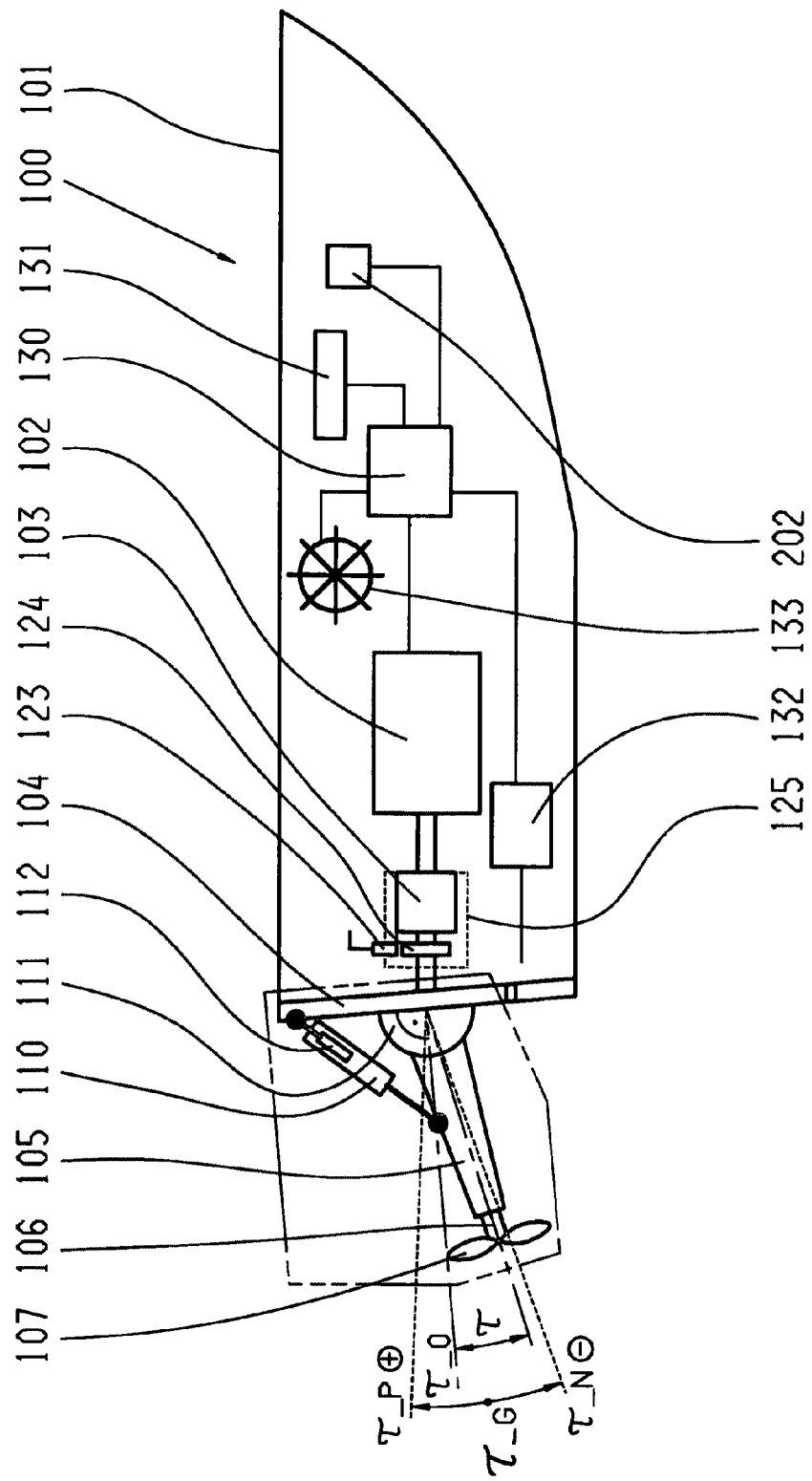
FIG. 1: a schematic side view illustration of a watercraft having a surface drive.
Figure 2:
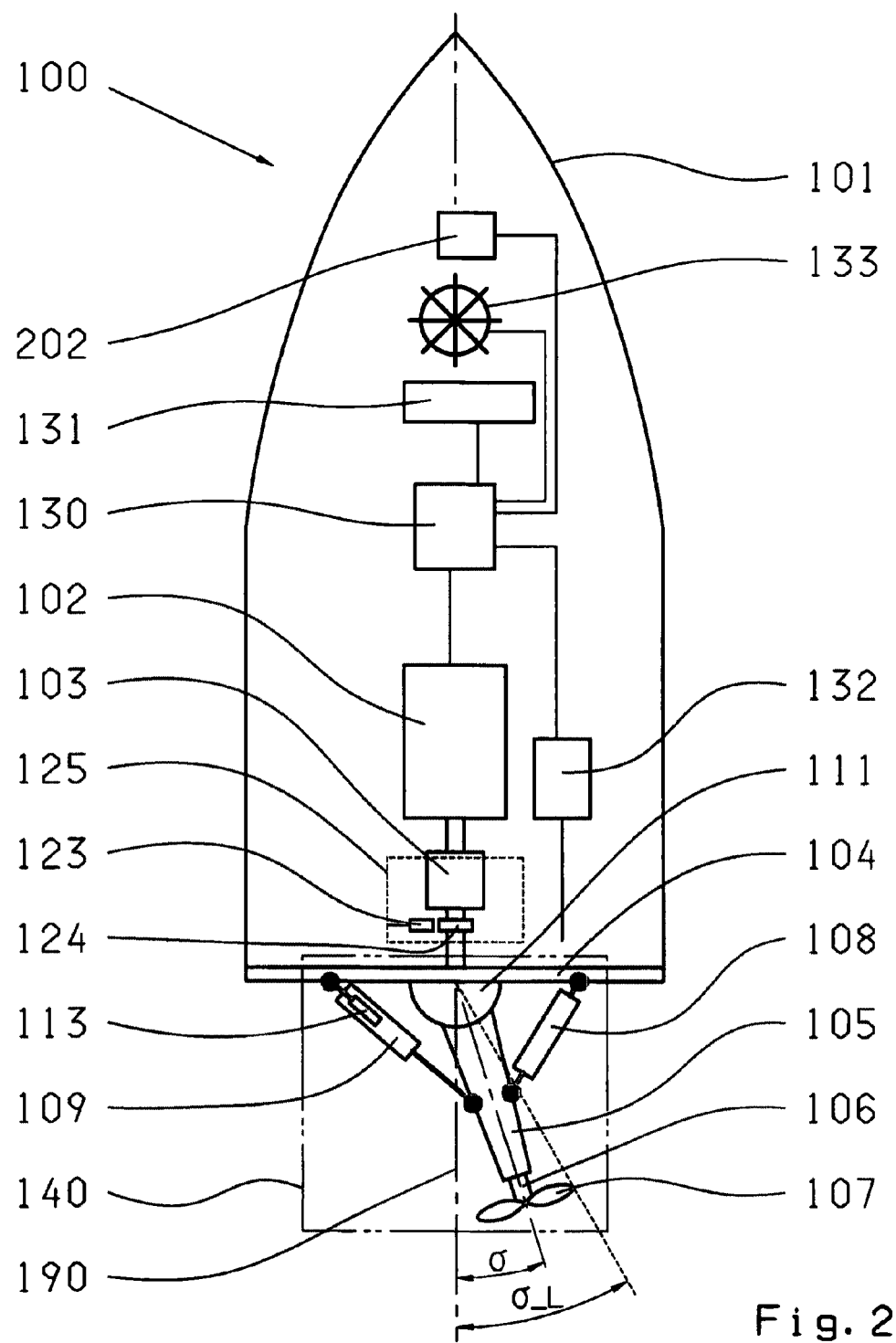
FIG. 2: a schematic top view illustration of a watercraft having a surface drive.

FIGS. 1 and 2 show a watercraft 100 with surface drive. The drive unit 140 of the surface drive is arranged at the stern side of the hull 101 of the watercraft 100 and connected with the transom 104. The drive unit 140 consists of the thrust tube 105 with the propeller shaft 106 and the propeller 107 as well as the control actuator system 108, 109 and the trim actuator system 110. The pivot-mounted propeller shaft 106, which has the propeller 107 attached to its stern end, is pivotally-mounted at the center of the thrust tube 105. The thrust tube 105 with the transom 104 and the propeller shaft 106 with the power train 125 are connected and pivotally-mounted at the articulation point 111. The power train 125 contains a transmission 103. The rotational speed sensor 123 measures the rotational speed n at a port plate 124, for example, whose signal is acquired by an electronic control unit 130. The pivoting movement about a horizontal plane, also referred to as control movement, originates from a steering wheel 133 via the electronic control unit 130 and the central hydraulic unit 132, which is controlled by the electronic control unit 130, and is effected by a control actuator system that consists of two hydraulically operated cylinders 108 and 109. The pivoting movement about a vertical plane, also referred to as trim movement, originates from a control panel 131 via the electronic control unit 130 and the central hydraulic unit 132 by means of the trim actuator system that consists of the hydraulically operated trim cylinders 110 and a stroke sensor 112. The control movement is completed within a maximum adjustable control angle $\sigma\_L$, measured from the longitudinal axis of horizontal plane 190, as shown in FIG. 2. The value for the control movement of the drive unit 140 is the control angle $\sigma$, which is measured from the longitudinal axis 190 as a neutral control angle $\sigma\_0 = 0°$. The measure for the trim movement of the drive unit 140 is trim angle T. The trim movement takes place within an angle that is designated trim level T_G and limited by an upper trim threshold T_P and a lower trim threshold T_N. The neutral trim position T_0, which is defined as $T\_0 = 0°$, is provided in the side view by the vertical axis onto the transom 104.

Figure 3:
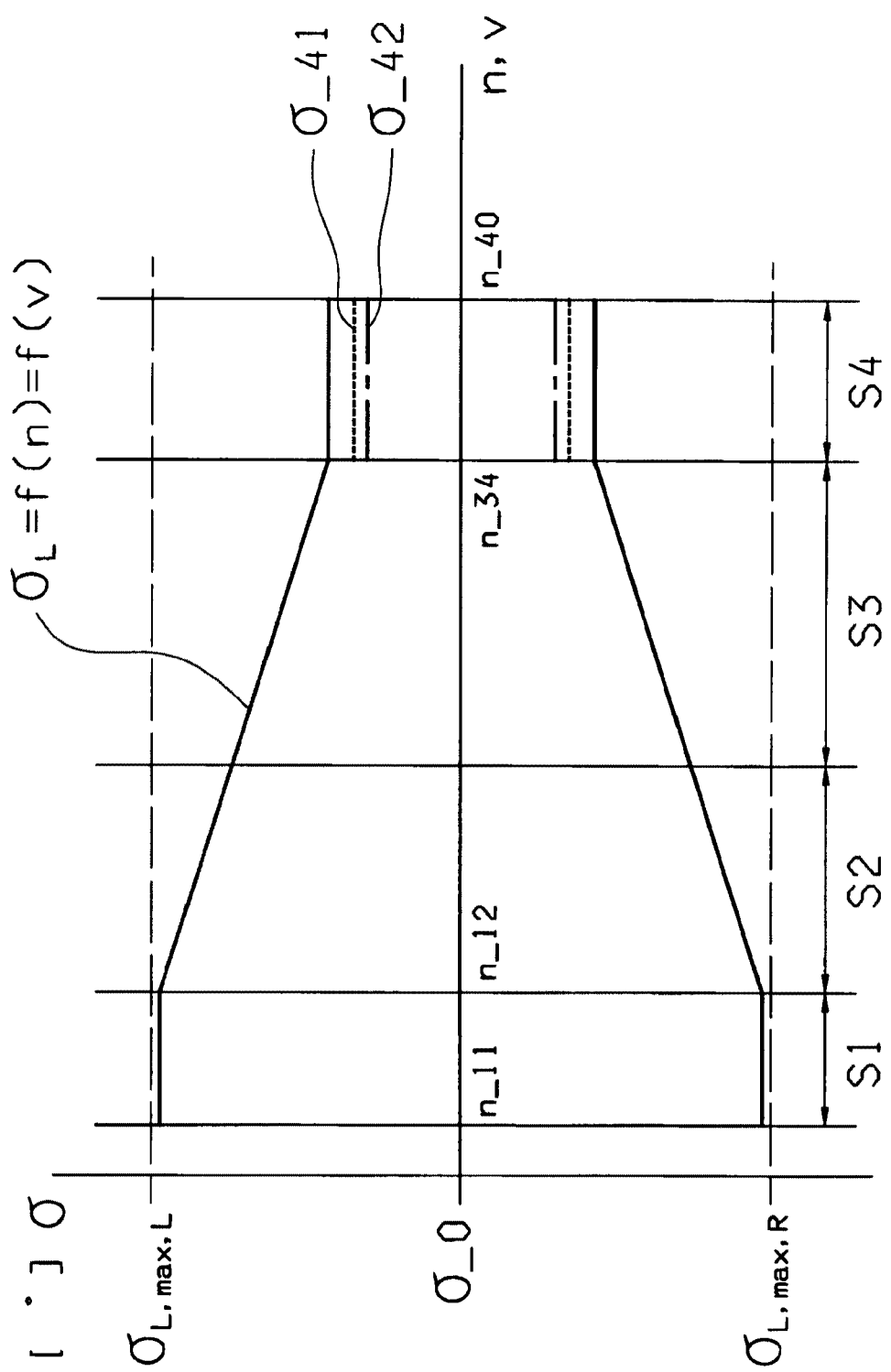
FIG. 3: a diagram showing the course of the trim angle above the rotational speed.

The diagram in FIG. 3 shows an example of the course of the maximum adjustable control angle $\sigma\_L$ above the rotational speed n and/or above the speed v, which is proportional to the rotational speed n. The control angle $\sigma$ is added to the ordinate of the diagram while the solid line represents the course of the maximum adjustable control angle $\sigma\_L$ above the rotational speed n and/or the speed v. The control angle $\sigma\_L$ can be adjusted from the rotational speed $n\_11 = 0$ rpm, and/or the stationary watercraft, up to a rotational speed limit $n\_12$ at the end of a low speed mode S1 up to its (illustrated as a dotted line) left or right maximum value $\sigma\_L,max,L$ and $\sigma\_L,max,R$. From the rotational speed limit $n\_12$ and/or the beginning of driving mode S2, the maximum adjustable control angle $\sigma\_L$ is reduced according to a function that is stored in an electronic control unit 130 and/or a table of values or a characteristic curve, within which values can be interpolated. Exceeding the maximum adjustable control angle $\sigma\_L$, even with the disabled automatic operating mode of the trim angle, is not possible. In a driving mode S4 starting at the rotational speed limit $n\_34$, where due to the high speed and/or high rotational speed the maximum adjustable control angle $\sigma\_L$ is at its lowest in order to prevent unstable drive conditions, the course of a first threshold control angle $\sigma\_41$ lies below the maximum adjustable control angle $\sigma\_L$. Exceeding the first threshold control angle $\sigma\_41$ initially activates an optical and/or acoustic signal to alert the skipper. If the control angle $\sigma$ is further increased, the electronic control unit switches to a stand-by operating mode 300 in which the trim angle T has to be manually adjusted until the threshold control angle $\sigma$ is reduced to such a degree that it is smaller than a second threshold control angle $\sigma\_42$. Both threshold control angles $\sigma\_41$ and $\sigma\_42$ may be equal. In order to prevent continuous back and forth switching, a hysteresis is created and a first threshold control angle $\sigma\_41$ is selected for the exceedance that is greater than the second threshold control angle $\sigma\_42$, where the automatic control of the trim angle T in the driving mode S4 is re-activated if it falls below the second threshold control angle. In the described example, the threshold control angles $\sigma\_41$ and $\sigma\_42$ as well as the maximum possible control angle $\sigma\_L$ are constant within the driving mode S4. Any course depending on the rotational speed n or speed is conceivable for both values since the maximum possible control angle $\sigma\_L$ as well as the first and second threshold control angles $\sigma\_41$ and $\sigma\_42$ are controlled according to a table of values that is stored in an electronic control unit, or a characteristic curve or a mathematical function. The table of values, characteristic curves or functions were, for example, compiled on the basis of tests that determined, as in the case of the threshold control angle $\sigma\_41$, from which control angle $\sigma$ the propeller on the outside curve was no longer running in the water at a constant speed. As shown in the diagram, the threshold control angles $\sigma\_41$ and $\sigma\_42$ are equal for left and right, but theoretically may also be different if this is necessary in terms of the geometry of the watercraft.

Figure 4:
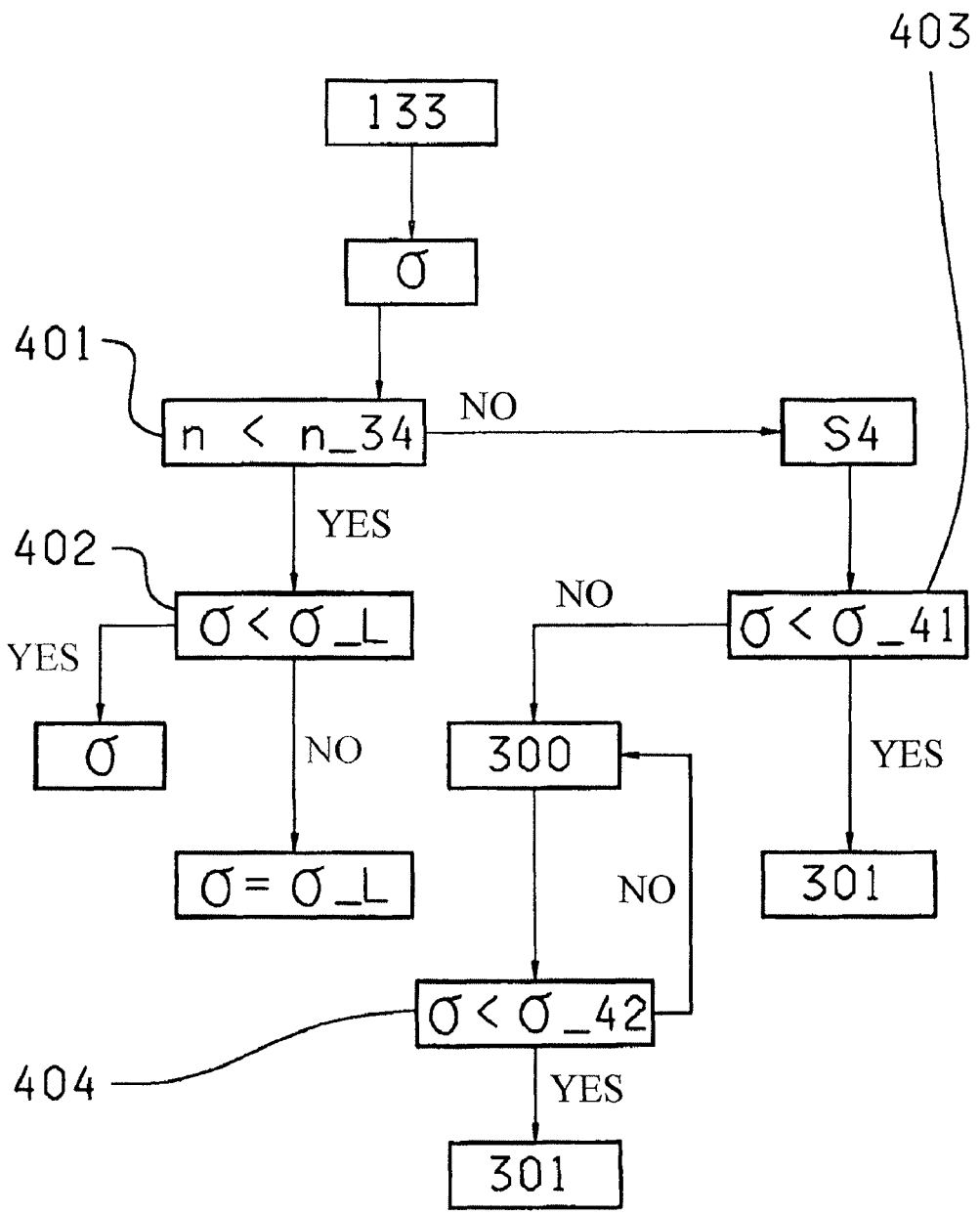
FIG. 4: a flow diagram of the shifting processes in the driving mode S4.

FIG. 4 shows a flow diagram of the shifting processes in the driving mode 4. A desired control angle $\sigma$ shall be adjusted when the steering wheel 133 is actuated. In the electronic control unit 130 the current rotational speed n is compared to the rotational speed limit $n\_34$ and the driving mode is thus determined for the respective operating mode. If the rotational speed n is smaller than the rotational speed limit $n\_34$, as compared in a step 401, then the desired control angle $\sigma$ can only be adjusted if, when compared in a step 402, it is smaller than the maximum adjustable control angle $\sigma\_L$ corresponding to the current rotational speed n, otherwise the control angle $\sigma$ will take the value of the maximum adjustable control angle $\sigma\_L$. The automatic operating mode 301 for adjusting the trim angle T remains active in both cases. If the rotational speed n is greater than the rotational speed limit $n\_34$, then the operating mode for the driving mode S4, in which the watercraft reaches its maximum speed, will applies. If in a comparative step 403 the desired control angle $\sigma$ is smaller than the threshold control angle $\sigma\_41$, the automatic operating mode 301 remains active for the adjustment of the trim angle T. If the control angle $\sigma$ exceeds the first threshold control angle $\sigma\_41$, the electronic control unit switches to a stand-by operating mode 300 in which the trim angle T has to be manually adjusted because, when the first threshold control angle $\sigma\_41$ is exceeded, the automatic adjustment of the trim angle cannot correct the rotational speed increase of the drive on the outside curve when the propeller on the outside curve emerges above the water surface. If, in a comparison step 404, the control angle σ is below the second threshold control angle σ_42, the automatic adjustment of the trim angle is re-activated, otherwise the stand-by operating mode 300 and thus the manual operating mode remain active.

Reference numerals
- 100 watercraft
- 101 hull
- 102 drive motor
- 103 transmission
- 104 transom
- 105 thrust tube
- 106 propeller shaft
- 107 propeller
- 108 control cylinder right
- 109 control cylinder left
- 110 trim cylinder
- 111 control angle
- 112 stroke sensor trim cylinder
- 113 stroke sensor control cylinder
- 123 rotational speed sensor propeller shaft
- 124 port plate
- 125 power train
- 130 electronic control unit
- 131 control panel
- 132 central hydraulic unit
- 133 rudder
- 140 drive unit
- 190 longitudinal axis
- 202 speed measuring device
- 300 stand-by operating mode
- S1 low speed mode
- S4 driving mode at which the maximum speed is reached
- n rotational speed
- n_11 starting rotational speed for S1
- n_12 second rotational speed limit
- n_34 rotational speed limit after S4
- n_40 maximum rotational speed for S4
- v speed of the watercraft
- v_40 maximum speed of the watercraft
- σ control angle
- σ_L maximum adjustable control angle left, right f(n)
- σ_L,max,L maximum value of the adjustable control angle, left
- σ_L,max,R maximum value of the adjustable control angle, right
- σ_0 neutral position of the control angle
- σ_41 first threshold control angle in the driving mode S4
- σ_42 second threshold control angle in the driving mode S4
- T trim angle
- T_P upper trim threshold
- T_N lower trim threshold
- T_0 medium position of the trim angle
- T_G trim range

The invention claimed is:

1. A method for controlling a watercraft comprising a drive which is pivotable about a central neutral position (σ_0) defining a control angle (σ) as the drive is adjusted horizontally, and a maximum adjustable control angle (σ_L) in a defined gradient being automatically reduced during speed increases, the method comprising the steps of:

configuring the drive as a surface drive comprising at least two drive units;

vertically adjusting the drive units about a medium position (T_0), thereby defining a trim angle (T), in a pre-adjustable automatic operating mode (301);

operating the surface drive in at least first and second driving modes, only operating in the second driving mode (S4) once a maximum threshold speed is reached;

when operating in the second driving mode (S4) and once the control angle (σ) exceeds a first threshold control angle (σ_41) which is smaller than the maximum adjustable control angle (σ_L), switching from the automatic operating mode (301) to a stand-by operating mode (300) in which the trim angle (T) is manually adjusted; and manually adjusting the trim angle (T), in the stand-by operating mode (300), until the control angle (σ) is less than a second threshold control angle (σ_42) at which the automatic operating mode (301) re-activated.

2. The method for controlling a watercraft according to claim 1, further comprising the steps of defining the first threshold control angle (σ_41) to be greater than the second threshold control angle (σ_42).

3. The method for controlling a watercraft according to claim 1, further comprising the steps of defining the first and the second threshold control angles and the maximum adjustable control angle (σ_L) to be dependent on at least one of a speed (v) of the watercraft and a rotational speed (n) and calculating the first and the second threshold control angles from one of a table of values, a characteristic curve stored in an electronic control unit (130) and according to a mathematical function.

4. The method for controlling a watercraft according to claim 1, further comprising the steps of defining the first and the second driving modes respectively by one of an upper and a lower rotational speed limit and an upper and a lower speed limit of the watercraft (100), and the rotational speed (n) is the rotational speed of one of a motor (102), a power train (125) and a propeller shaft (106).

5. The method for controlling a watercraft according to claim 1, further comprising the steps of maintaining the maximum adjustable control angle (σ_L) in the first driving mode (S1), which extends from a first rotational speed limit to a second rotational speed limit of at least one of a speed (v) of the watercraft and a rotational speed (n); and upon an increase of at least one of the speed (v) of the watercraft and the rotational speed (n) above the second rotational speed limit, linearly reducing the maximum adjustable control angle (σ_L), in at least one other driving mode.

6. The method for controlling a watercraft according to claim 1, further comprising the steps of maintaining the maximum adjustable control angle (σ_L) at a maximum, in the first driving mode (S1) which extends from a first rotational speed limit to a second rotational speed limit of at least one of a speed (v) of the watercraft and a rotational speed (n); and maintaining the maximum adjustable control angle (σ_L), as a speed increases, in each driving mode in which the automatic adjustment of the trim angle (T) takes place according a different operating mode and decreasing the maximum adjustable control angle (σ_L), in a step wise manner, at the transition from the first driving mode to the second or a next higher driving mode.

* * * * *